(12) United States Patent
Burke et al.

(10) Patent No.: US 11,708,871 B2
(45) Date of Patent: Jul. 25, 2023

(54) CENTRIFUGAL LIFT-OFF RATCHETING ONE-WAY CLUTCH WITH ROCKER POCKETS

(71) Applicant: Schaeffler Technologies AG & Co. KG, Herzogenaurach (DE)

(72) Inventors: Peter Burke, Charlotte, NC (US); Carsten Behler, Wooster, OH (US); Michael Hodge, Creston, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 74 days.

(21) Appl. No.: 17/386,717

(22) Filed: Jul. 28, 2021

(65) Prior Publication Data

US 2022/0090640 A1  Mar. 24, 2022

Related U.S. Application Data

(60) Provisional application No. 63/081,236, filed on Sep. 21, 2020.

(51) Int. Cl.
*F16D 41/12* (2006.01)
*F16D 41/04* (2006.01)

(52) U.S. Cl.
CPC ............. *F16D 41/12* (2013.01); *F16D 41/04* (2013.01)

(58) Field of Classification Search
CPC ................................. F16D 41/04; F16D 41/12
See application file for complete search history.

(56) References Cited

U.S. PATENT DOCUMENTS

| 10,955,014 B1 | 3/2021 | Burke et al. |
| 2009/0266667 A1* | 10/2009 | Sarnie ................. F16D 41/16 192/43.1 |
| 2013/0228410 A1 | 9/2013 | Sugimura |
| 2015/0285319 A1* | 10/2015 | Kawai ................. F16D 41/30 192/45.1 |
| 2019/0162250 A1* | 5/2019 | Yamada ............... F16D 41/12 |
| 2020/0240480 A1 | 7/2020 | Hodge et al. |

FOREIGN PATENT DOCUMENTS

| CN | 101457801 | 6/2009 |
| CN | 102410315 | 4/2012 |
| JP | 2017110707 | 6/2017 |
| JP | 2018066430 | 4/2018 |

* cited by examiner

*Primary Examiner* — Lori Wu
(74) *Attorney, Agent, or Firm* — Volpe Koenig

(57) ABSTRACT

A one-way clutch, including: an outer race including a first outer race plate defining a first rocker pocket and a second outer race plate non-rotatably connected to the first outer race plate and defining a second rocker pocket; an inner race axially disposed between the first outer race plate and the second outer race plate; and a rocker assembly including a rocker arranged to contact the inner race and including a first portion disposed in the first rocker pocket and a second portion disposed in the second rocker pocket, a spring guide retained by the first outer race plate and the second outer race plate, and a spring engaged with the spring guide and in contact with the rocker.

19 Claims, 11 Drawing Sheets

CENTRIFUGAL LIFT-OFF RATCHETING ONE-WAY CLUTCH WITH ROCKER POCKETS

CROSS-REFERENCE TO RELATED APPLICATIONS

This application claims the benefit under 35 U.S.C. § 119(e) of U.S. Provisional Application No. 63/081,236 filed on Sep. 21, 2020, which application is incorporated herein by reference.

TECHNICAL FIELD

The present disclosure relates to a centrifugal lift-off ratcheting one-way clutch with dual outer race plates forming chambers for rocker assemblies.

BACKGROUND

Known ratcheting one-way clutches are used in a variety of power train configurations.

SUMMARY

According to aspects illustrated herein, there is provided a one-way clutch, including: an outer race including a first outer race plate defining a first rocker pocket and a second outer race plate non-rotatably connected to the first outer race plate and defining a second rocker pocket; an inner race axially disposed between the first outer race plate and the second outer race plate; and a rocker assembly including a rocker arranged to contact the inner race and including a first portion disposed in the first rocker pocket and a second portion disposed in the second rocker pocket, a spring guide retained by the first outer race plate and the second outer race plate, and a spring engaged with the spring guide and in contact with the rocker.

According to aspects illustrated herein, there is provided a one-way clutch, including: an outer race including a first outer race plate including a first annular planar surface facing in a first axial direction parallel to an axis of rotation of the one-way clutch and a first pocket wall off-set, in a second axial direction opposite the first axial direction, from the first planar annular surface, and defining a first rocker pocket in the second axial direction, and a second outer race plate including a second annular planar surface facing in the second axial direction and a second pocket wall off-set, in the first axial direction, from the second planar annular surface, and defining a second rocker pocket in the first axial direction; an inner race axially disposed between the first outer race plate and the second outer race plate, and a rocker assembly including a rocker including a first portion disposed in the first rocker pocket and a second portion disposed in the second rocker pocket, a spring guide retained by the first outer race plate and the second outer race plate and including a spring arm, and a spring retained by the first outer race plate and the second outer race plate, wrapped around the spring arm, and in contact with the rocker.

According to aspects illustrated herein, there is provided a one-way clutch, including: an outer race including a first outer race plate including a first annular planar surface facing in a first axial direction parallel to an axis of rotation of the one-way clutch and a first pocket wall off-set, in a second axial direction opposite the first axial direction, from the first planar annular surface, and defining a first rocker pocket in the second axial direction, and a second outer race plate including a second annular planar surface facing in the second axial direction and a second pocket wall off-set, in the first axial direction, from the second planar annular surface and defining a second rocker pocket in the first axial direction; an inner race axially disposed between the first outer race plate and the second outer race plate; and a rocker assembly including a rocker including a first portion disposed in the first rocker pocket and a second portion disposed in the second rocker pocket, a spring guide including a spring arm, a first portion disposed in the first rocker pocket, and a second portion disposed in the second rocker pocket, and a spring wrapped around the spring arm, in contact with rocker, and including a first portion disposed in the first rocker pocket and a second portion disposed in the second rocker pocket.

BRIEF DESCRIPTION OF THE DRAWINGS

Various embodiments are disclosed, by way of example only with reference to the accompanying schematic drawings in which corresponding reference symbols indicate corresponding parts in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices, or materials similar or equivalent to those described herein can be used in the practice or testing of the disclosure.

Figure 1:
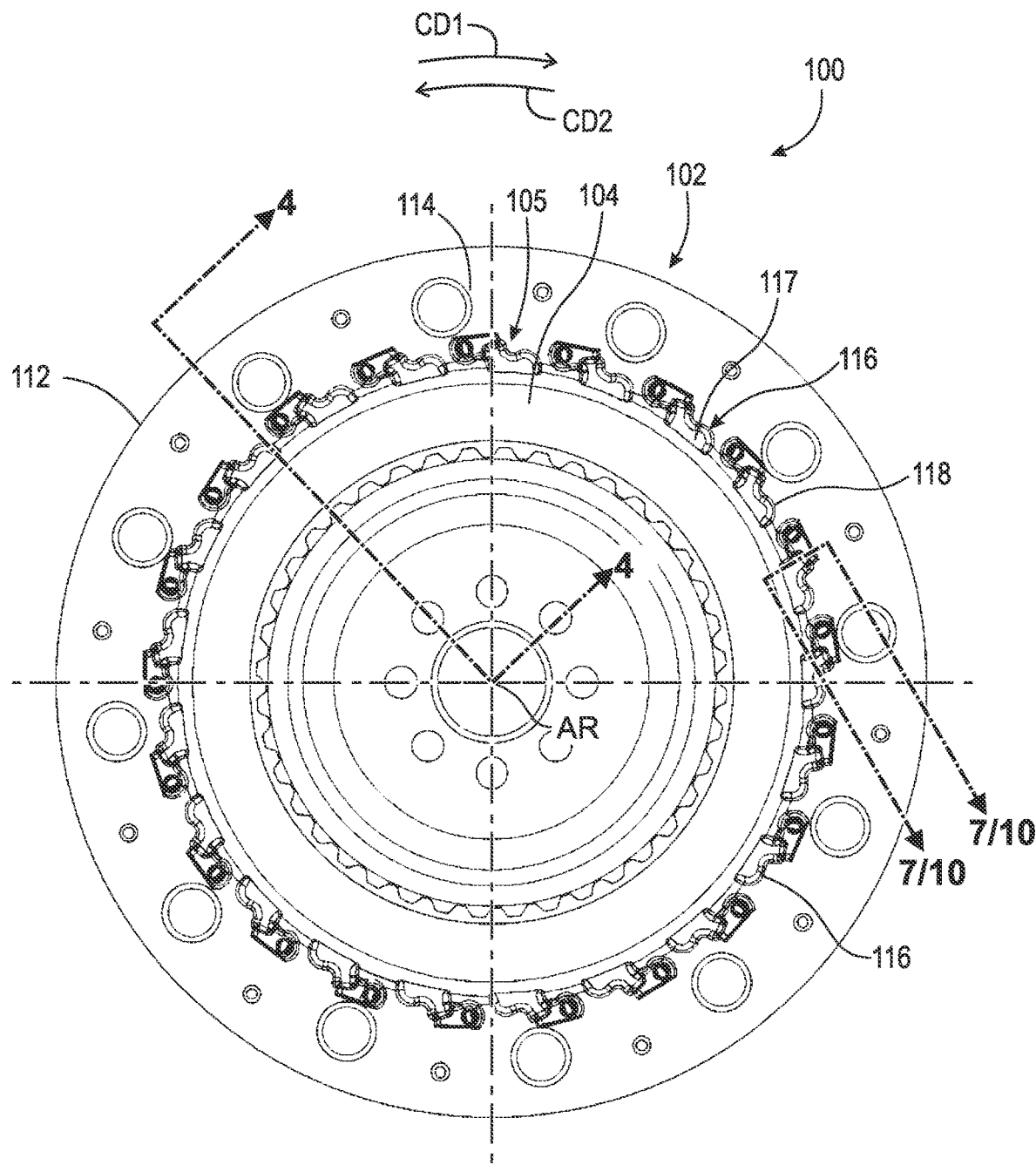
FIG. 1 is a front view of an example centrifugal lift-off ratcheting one-way clutch with rocker pockets.

FIG. 1 is a front view of an example centrifugal lift-off ratcheting one-way clutch 100, with rocker pockets.

Figure 2:
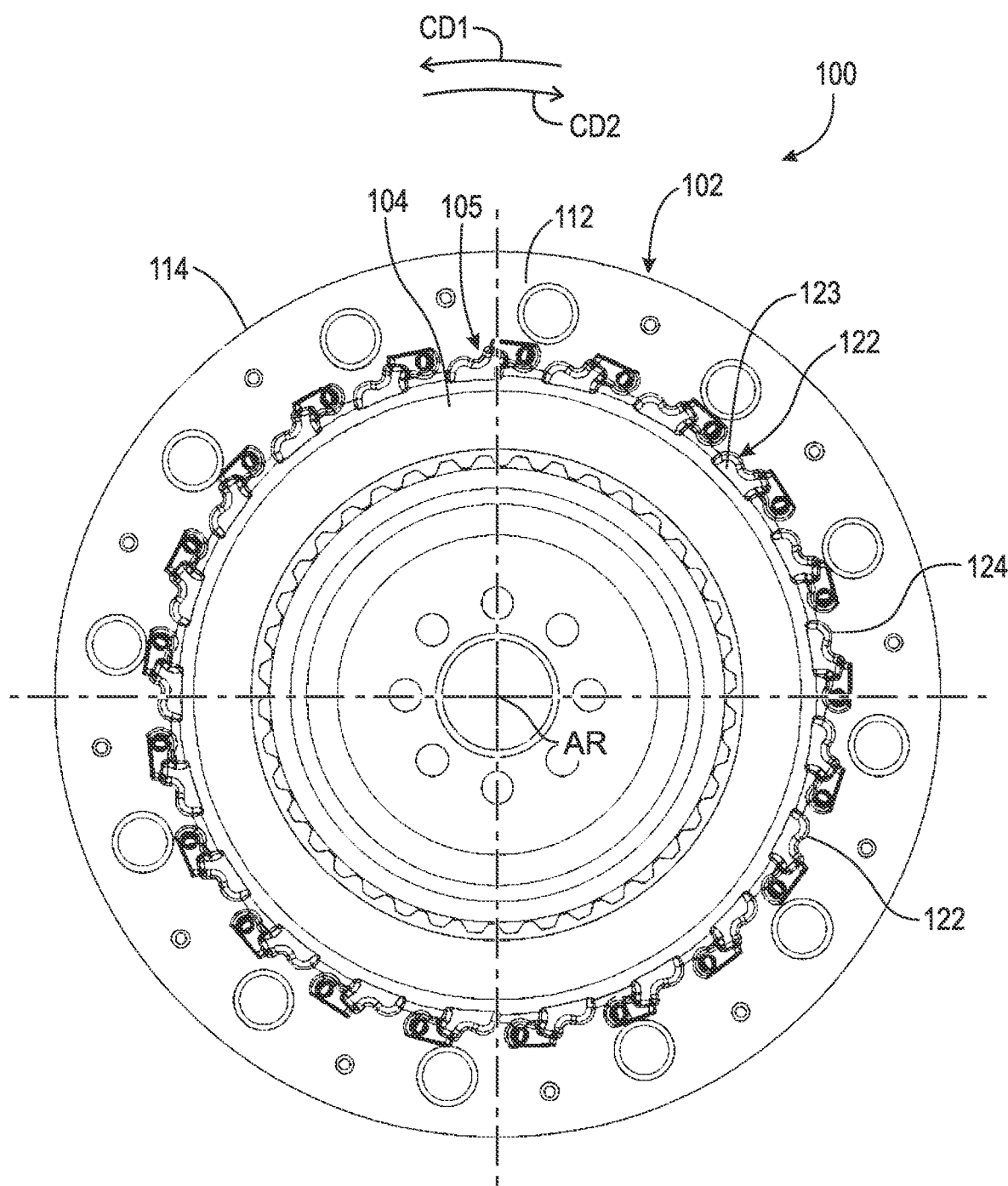
FIG. 2 is a back view of the centrifugal lift-off ratcheting one-way clutch shown in FIG. 1.

FIG. 2 is a back view of centrifugal lift-off ratcheting one-way clutch 100 shown in FIG. 1.

Figure 3:
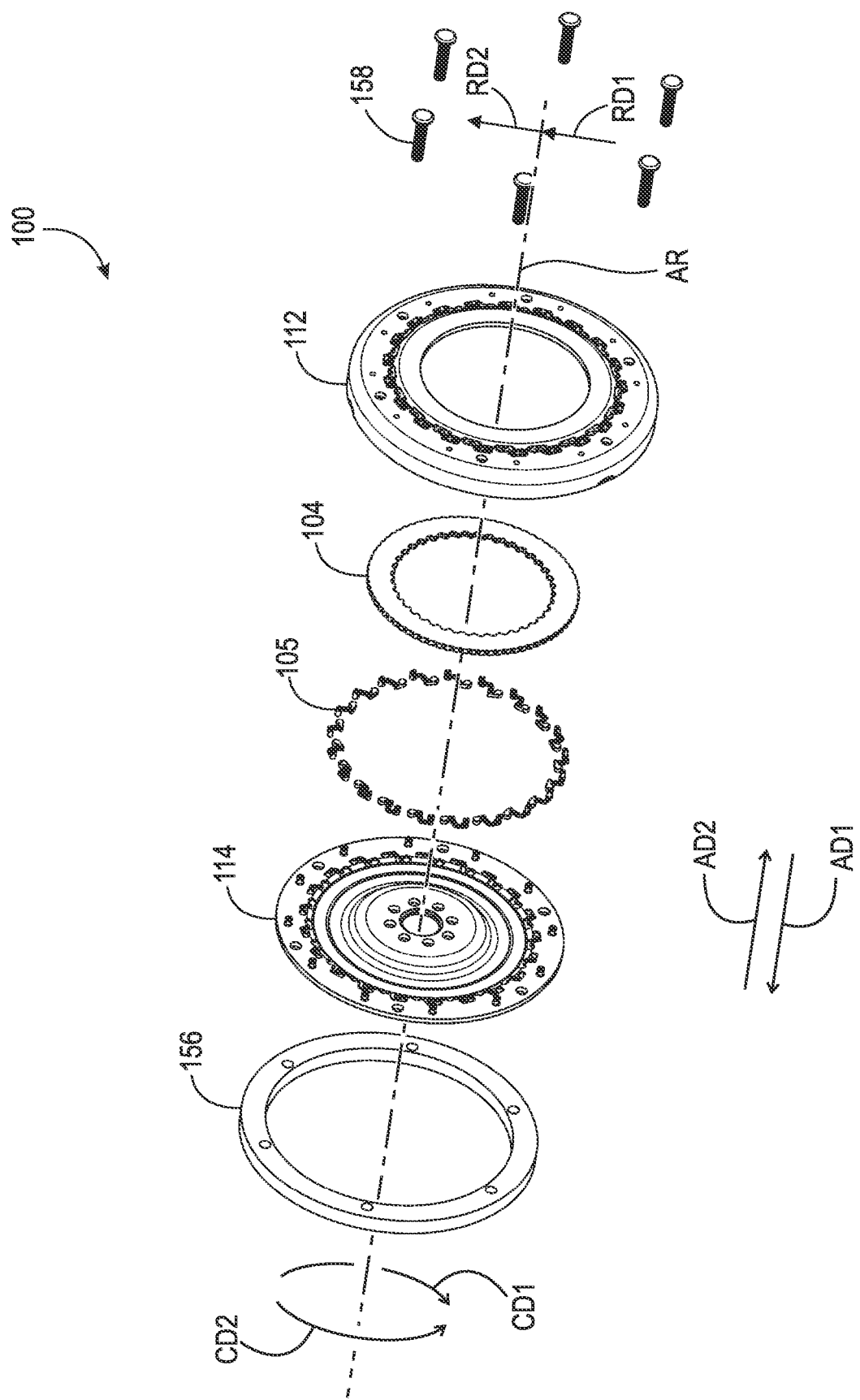
FIG. 3 is an exploded view of the centrifugal lift-off ratcheting one-way clutch shown in FIG. 1.

FIG. 3 is an exploded view of centrifugal lift-off ratcheting one-way clutch 100 shown in FIG. 1.

Figure 4:
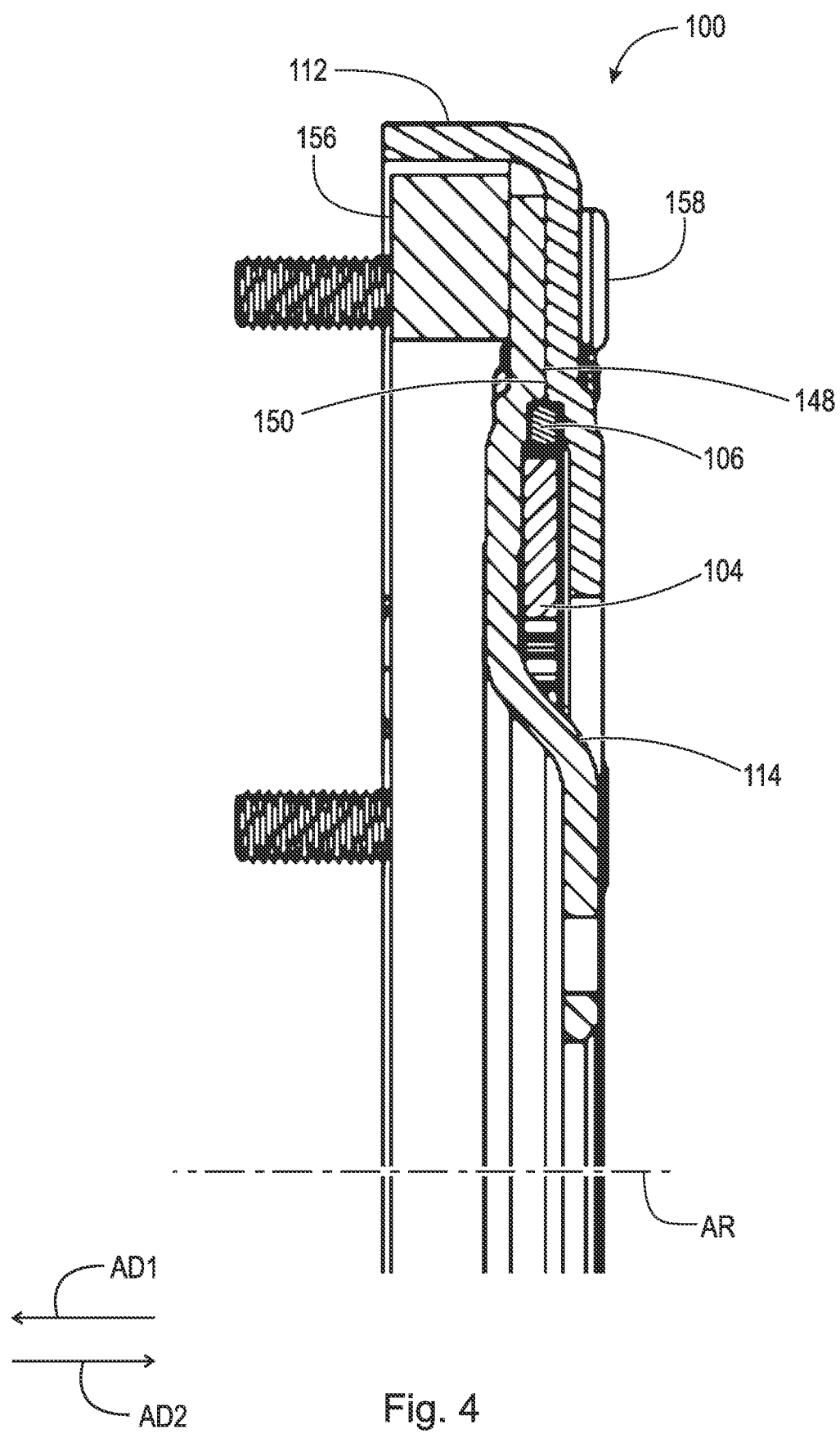
FIG. 4 is a cross-sectional view generally along line 4-4 in FIG. 1.

FIG. 4 is a cross-sectional view generally along line 4-4 in FIG. 1. The following should be viewed in light of FIGS. 1 through 4. Centrifugal lift-off ratcheting one-way clutch 100 includes: outer race 102; inner race 104; and rocker assemblies 105.

Figure 5:
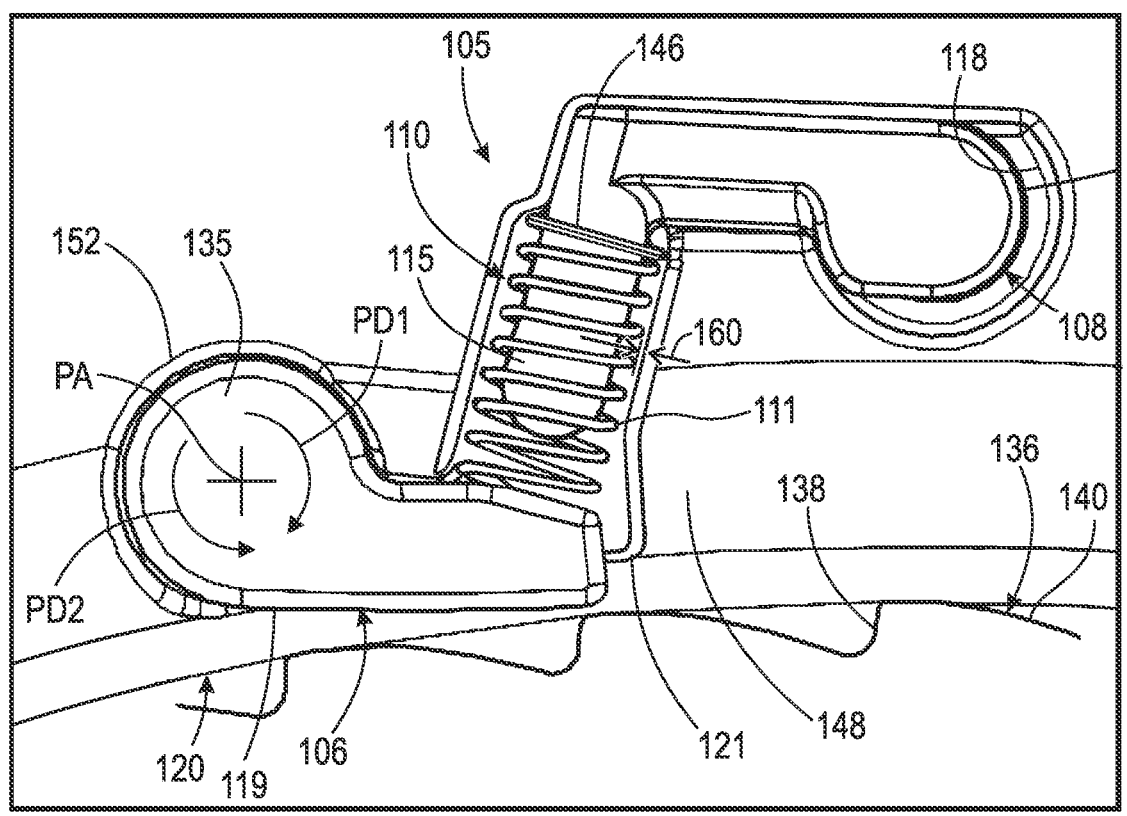
FIG. 5 is a back view of a pocket, in a front outer race plate shown in FIG. 1, with a rocker assembly in a lift-off mode.

FIG. 5 is a back view of a pocket, in a front outer race plate shown in FIG. 1, with a rocker assembly in a lift-off mode.

Figure 6:
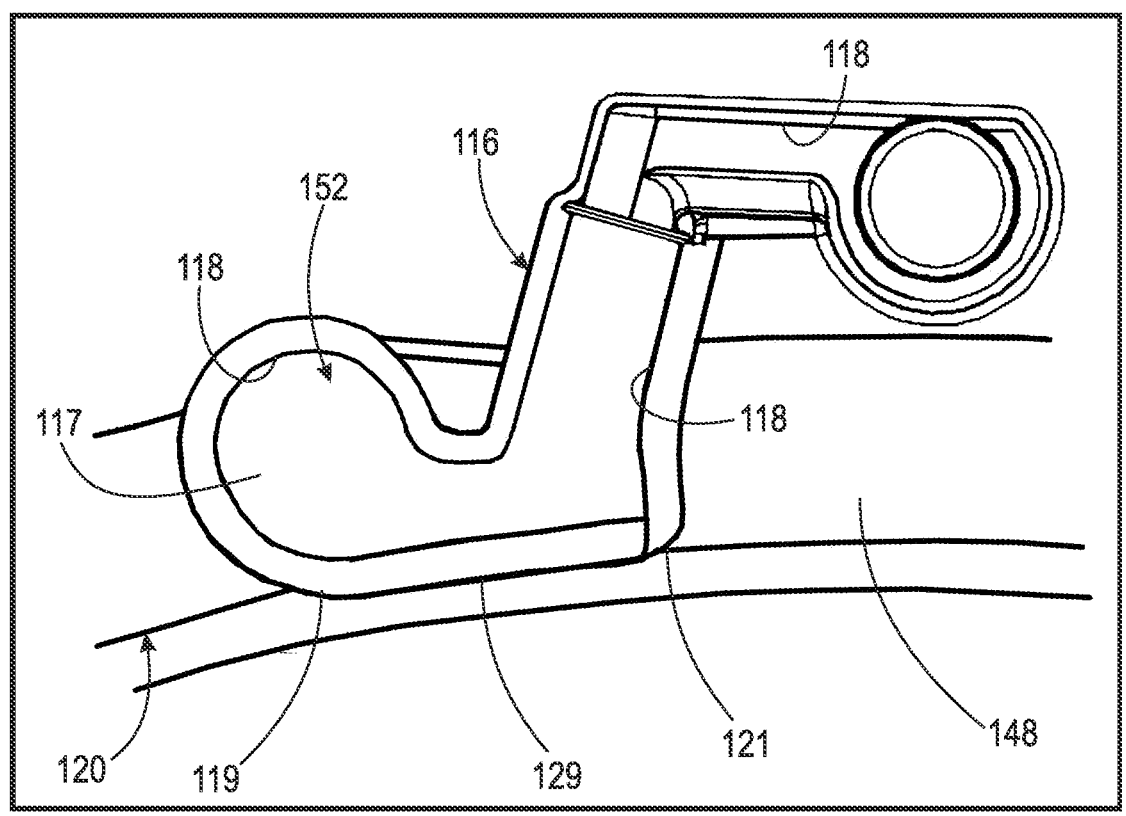
FIG. 6 is a back view of the pocket shown in FIG. 5, with the rocker assembly removed.

FIG. 6 is a back view of the pocket shown in FIG. 5, with the rocker assembly removed. The following should be viewed in light of FIGS. 1 through 6. Each rocker assembly 105 includes: rocker 106; spring guide 108; and spring 110. Spring 110 includes helical coils 111. Outer race 102 includes front outer race plate 112 and rear outer race plate 114 non-rotatably connected to outer race plate 112 by any means known in the art. Spring guides 108 include arms 115. Each spring 110 is wrapped around a respective arm 115.

By "non-rotatably connected" components, we mean that components are connected so that whenever one of the components rotates, all the components rotate; and relative rotation between the components is precluded. Radial and/or axial movement of non-rotatably connected components with respect to each other is possible. Components connected by tabs, gears, teeth, or splines are considered as non-rotatably connected despite possible lash inherent in the connection. The input and output elements of a closed clutch are considered non-rotatably connected despite possible slip in the clutch. The input and output parts of a vibration damper, engaged with springs for the vibration damper, are not considered non-rotatably connected due to the compression and unwinding of the springs. Without a further modifier, the non-rotatable connection between or among components is assumed for rotation in any direction. However, the non-rotatable connection can be limited by use of a modifier. For example, "non-rotatably connected for rotation in circumferential direction CD1," defines the connection for rotation only in circumferential direction CD1.

Figure 7:
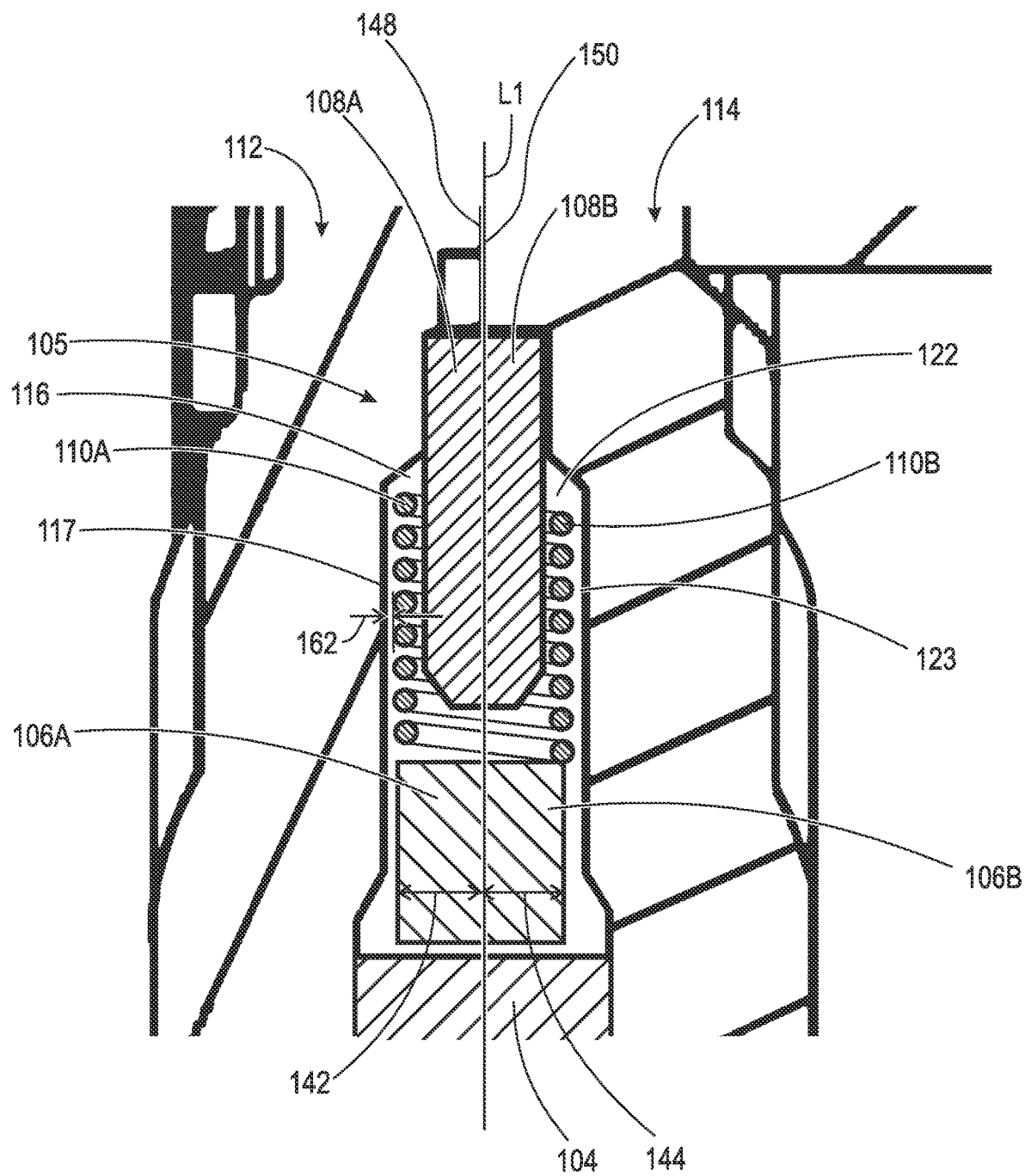
FIG. 7 is a cross-sectional view generally along line 7/10-7/10 in FIG. 1.

FIG. 7 is a cross-sectional view generally along line 7/10-7/10 in FIG. 1. The following should be viewed in light of FIGS. 1 through 7. Inner race 104 is axially disposed between plate 112 and plate 114. Front outer race plate 112 defines pockets 116. For example, outer race plate 112 includes pocket walls 117 and pocket walls 118. Pocket walls 117 face at least partly in axial direction, parallel to axis of rotation AR of clutch 100, and define pockets 116 in axial direction AD2, opposite direction AD1. By "define" a pocket in a direction, we mean to form a boundary of the pocket in the direction. Pocket walls 118 define pockets 116 in: radially inner and outer directions RD1 and RD2, respectively; and opposite circumferential directions CD1 and CD1, around axis of rotation AR of clutch 100. Each pocket wall 118 includes: end 119 terminating at circumferential wall 120 of race plate 112; and end 121 terminating at circumferential wall 120. In the example of FIG. 1, walls 118 are continuous between ends 119 and 121.

Figure 8:
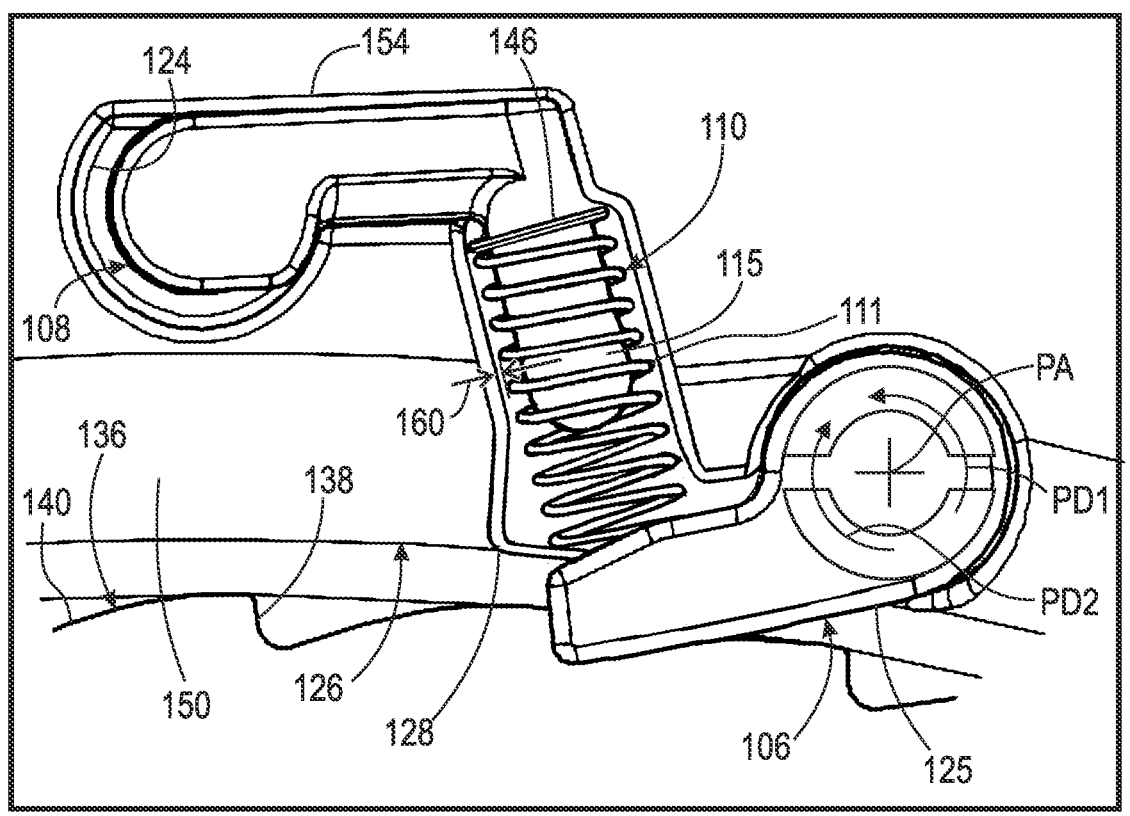
FIG. 8 is a front view of a pocket in a rear outer race plate, shown in FIG. 2, with a rocker assembly in a locked mode.

FIG. 8 is a front view of a pocket in rear outer race plate 114, shown in FIG. 2, with a rocker assembly 105 in a locked mode.

Figure 9:
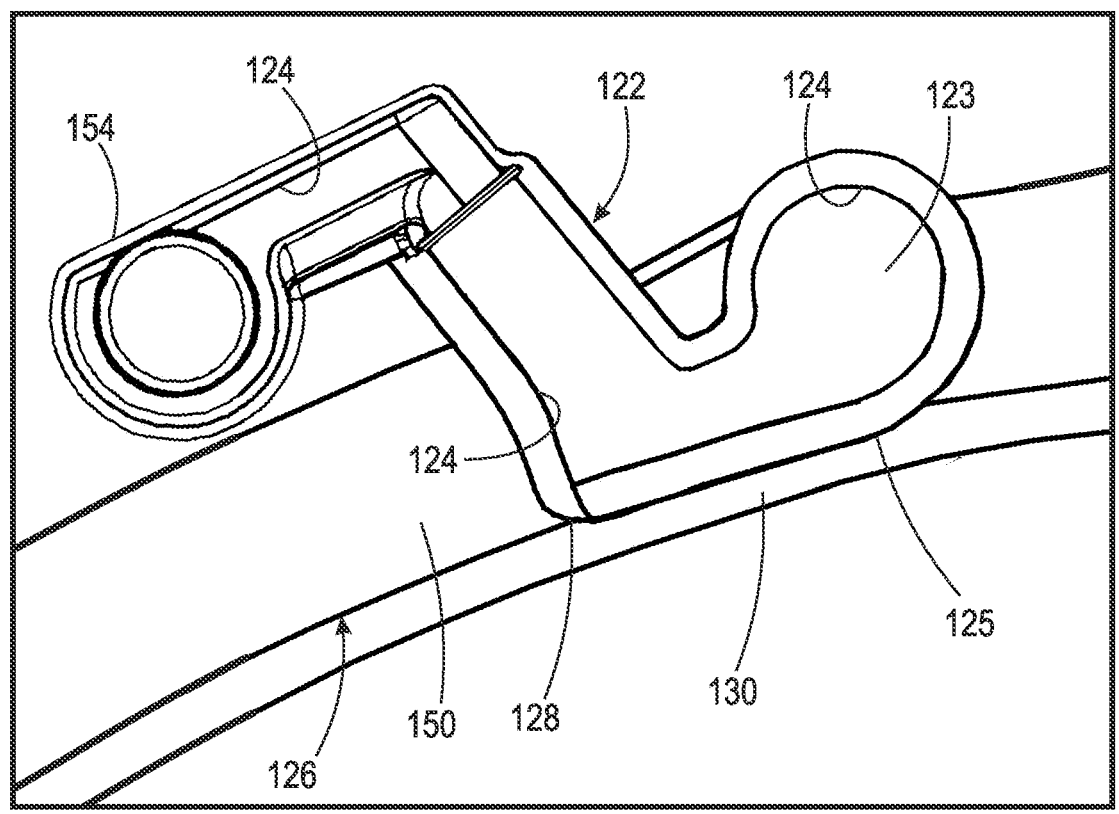
FIG. 9 is a front view of the pocket shown in FIG. 8 with the rocker assembly removed.

FIG. 9 is a front view of the pocket shown in FIG. 8 with rocker assembly 105 removed. The following should be viewed in light of FIGS. 1 through 9. Outer race plate 114 defines pockets 122. For example, outer race plate 114 includes pocket walls 123 and pocket walls 124. Pocket walls 123 face at least partly in axial direction AD2, and define pockets 122 in axial direction AD1. Pocket walls 124 define pockets 122 in: directions RD1 and RD2 and circumferential directions CD1 and CD1. Each pocket wall 124 includes: end 125 terminating at circumferential wall 126 of race plate 114; and end 128 terminating at circumferential wall 126. In the example of FIG. 1, walls 124 are continuous between ends 125 and 128.

Ends 119 and 121 define openings 129 facing radially inwardly, in wall 120. Ends 125 and 128 define openings 130, facing radially inwardly, in wall 126. Rockers 106 extend radially inwardly from pockets 116 and 122 through openings 129 and 130, respectively.

Figure 10:
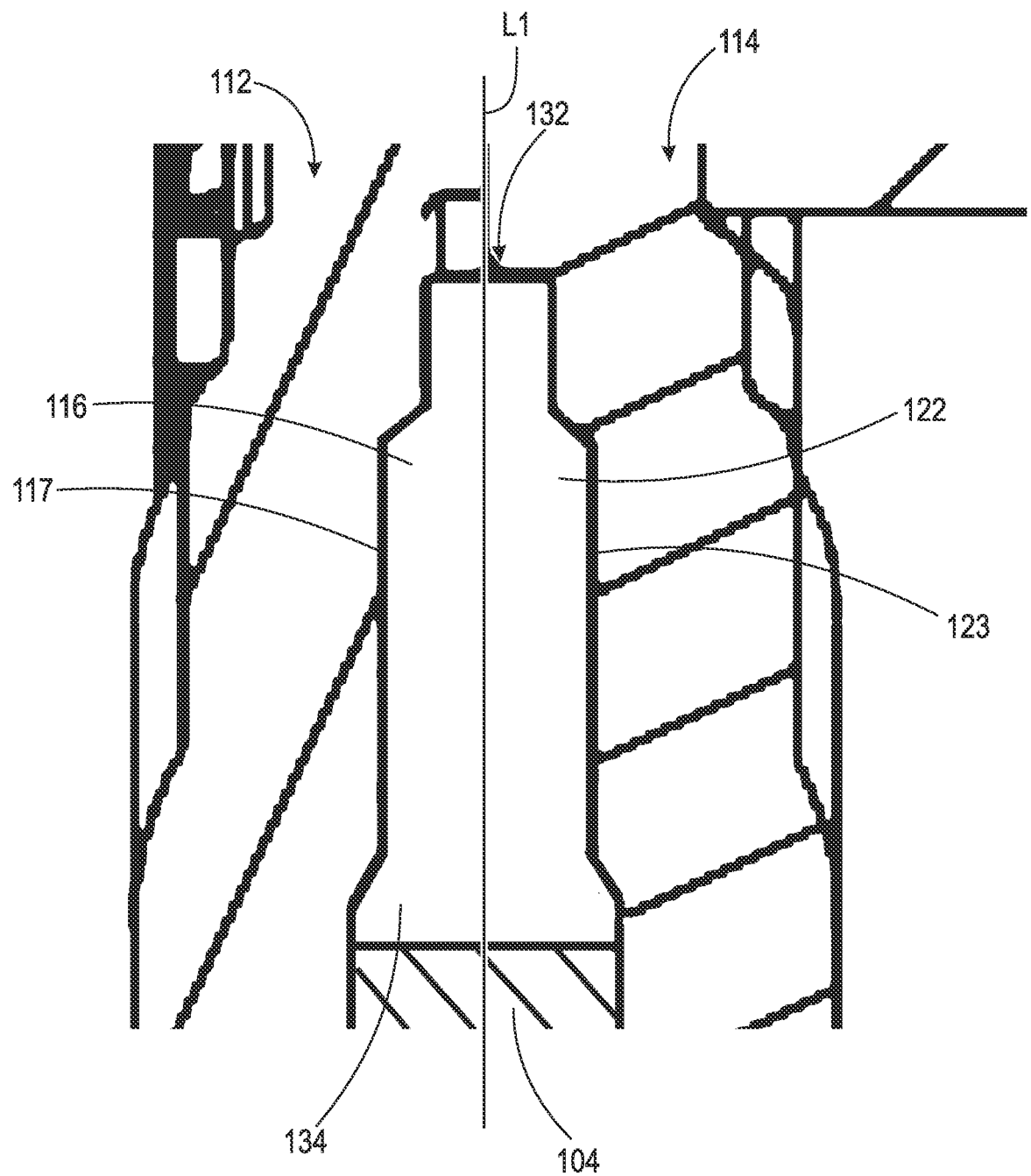
FIG. 10 is a cross-sectional view generally along line 7/10-7/10 in FIG. 1 with a rocker assembly removed.

FIG. 10 is a cross-sectional view generally along line 7/10-7/10 in FIG. 1 with rocker assembly 105 removed. Respective sets of walls 117, 118, 123, and 124 define rocker chambers 132 and respective radially inwardly facing openings 134. For example, respective pairs of pockets 116 and 122 form chambers 132. Each rocker assembly 105 is disposed at least partly in a respective rocker chamber 132. In the example of FIGS. 7 and 10, line L1 divides rocker assembly 105 and is used to depict: pocket 116; pocket 122; and portions of rocker assemblies 105 in pockets 116 and 122. In the example of FIGS. 7 and 10, line L1 divides chamber 132. For example: portion 106A of rocker 106 is disposed in pocket 116; portion 106B of rocker 106 is disposed in pocket 122; portion 108A of spring guide 108 is disposed in pocket 116; portion 108A of spring guide 108 is disposed in pocket 122; portion 110A of spring 110 is disposed in pocket 116; and portion 110B of spring 110 is disposed in a pocket 122.

Springs 110 urge rockers 106 in pivot direction PD1 around pivot axis PA passing through portions 135 of rockers 106. Portions 135 are not rotatable in direction CD1 or CD2 with respect to outer race 102. Inner race 104 includes teeth 136 with surfaces 138 facing at least partly in direction CD1, and ramp surfaces 140 sloping radially outwardly along direction CD1.

For the locked mode of FIG. 8, rotational torque transmitted through clutch 100 causes relative rotation of outer race 102, in direction CD2, with respect to inner race 104. Springs 110 urge at least one rocker 106 in direction PD1 and into contact with a surface 140 of a tooth 136. The rocker 106 slides along the surface 140 in direction CD2 until the rocker contacts a surface 138 of the tooth 136, which blocks further rotation of outer race 102, with respect to inner race 104, in direction CD2.

Figure 11:
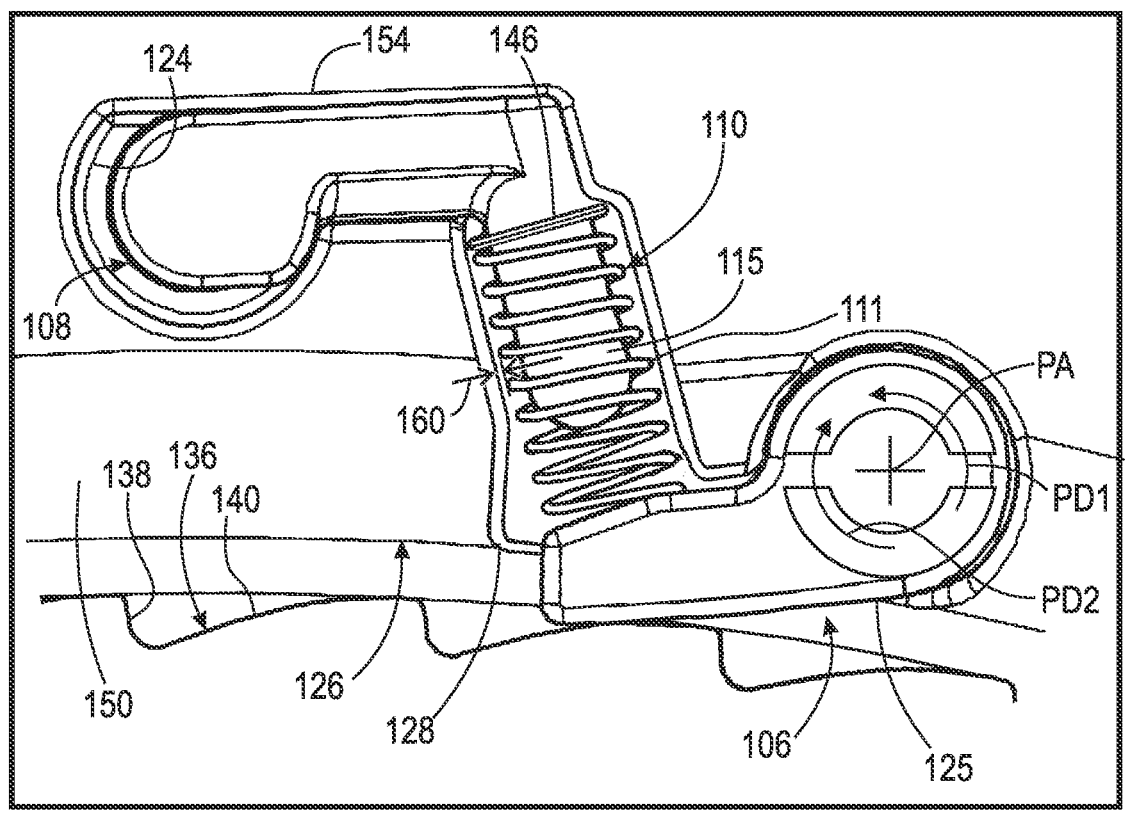
FIG. 11 is a front view of a pocket in a rear outer race plate shown in FIG. 2, with a rocker assembly in a free-wheel mode.

FIG. 11 is a front view of a pocket 122 in rear outer race plate 114, shown in FIG. 2, with rocker assembly 105 in a free-wheel mode. The following should be viewed in light of FIGS. 1 through 11. For the free-wheel mode of FIG. 11, rotational torque transmitted through clutch 100 causes relative rotation of outer race 102 in direction CD1, with respect to inner race 104. Rockers 106 slide radially outwardly along successive ramp surfaces 140 in direction CD1 without contacting surfaces 138. Thus, outer race 102 is rotatable with respect to inner race 104 in direction CD1.

For the lift-off mode of FIG. 5, rotational torque is applied to outer race 102 in direction CD1 and clutch 100 is initially in the free-wheel mode. When the speed of the relative rotation of outer race 102, in direction CD1 with respect to inner race 104, has increased sufficiently, clutch 100 transitions to the lift-off mode. In particular, the centrifugal force generated by the rotation of outer race 102 rotates rockers 106 in direction PD2, causing rockers 106 to rotate free of contact with teeth 136.

Portions 106A of rockers 106 have maximum dimension 142, in direction AD1 and portions 1068 of rockers 106 have maximum dimension 144 in direction AD1. In the example of FIG. 1: dimension 142 is equal to dimension 144. In an example embodiment, not shown: one of dimension 142 or dimension 144 is at least one quarter of the other of dimension 142 or dimension 144; one of dimension 142 or dimension 144 is at least one third of the other of dimension 142 or dimension 144; or dimensions 142 and 144 are unequal.

In the example of FIG. 1: an entirety of each spring guide 108 is disposed in a respective rocker chamber 132 in each of the locked mode, the free-wheel mode, and the lift-off mode; for each spring 110, at least end 146 is disposed in a respective rocker chamber 132 in each of the locked mode the free-wheel mode, and the lift-off mode; and for each rocker 106, portion 135 is disposed in a respective rocker chamber 132 in each of the locked mode, the free-wheel mode, and the lift-off mode.

Outer race plate 112 includes planar, annular surface 148 facing in direction AD1 and outer race plate 114 includes planar, annular surface 150 facing in direction ADZ. Walls 118 form edges 152 in surface 148. Walls 124 form edges 154 in surface 150. Walls 117 are off-set from surface 148 in direction AD2. Walls 123 are off-set from surface 150 in direction AD1.

FIG. 10 is a cross-sectional view generally along line 10-10 in FIG. 1. In the example of FIG. 1, clutch 100 includes inertia ring 156 and fasteners 158. Fasteners 158 pass through and non-rotatably connect outer race plate 112, outer race plate 114, and inertia ring 156.

As seen, for example, in FIG. 7, rocker assembly 105 is partly disposed in pocket 116 and partly disposed in pocket 122. Springs 110 are wrapped around and in contact with spring arms 1115. Springs 110 are retained in place at least partly by spring guides 108 and spring arms 115. In the example of FIG. 1, springs 110 are retained in place solely by spring guides 108 and spring arms 115. For example, at least one half of coils 111 are free of contact with plates 112 and 114, In the example of FIG. 1, every coil 111 is free of contact with plates 112 and 114, For example: pocket walls 118 and 124 are separated from coils 111 by gap 160; and pocket walls 117 and 123 are separated from coils 111 by gap 162.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE CHARACTERS

AD1 axial direction
AD2 axial direction
AR axis of rotation
CD1 circumferential direction
CD2 circumferential direction
PA pivot axis
PD1 pivot direction
PD2 pivot direction
100 centrifugal lift-off ratcheting one-way clutch
102 outer race
104 inner race
105 rocker assembly
106 rocker
108 spring guide
110 spring
111 coil, spring
112 outer race plate
114 outer race plate
115 spring arm, spring guide
116 pocket
117 pocket wall, outer race plate
118 pocket wall, outer race plate
119 end, pocket wall
120 circumferential wall, outer race plate
121 end, pocket wall
122 pocket
123 pocket wall, outer race plate
124 pocket wall, outer race plate
125 end, pocket wall
126 circumferential wall, race plate
128 end, pocket wall
129 opening, outer race plate
130 opening, outer race plate
132 rocker chamber
134 opening, rocker chamber
135 portion, rocker
135 tooth, inner race
138 surface, tooth
140 ramp surface, tooth
142 dimension, rocker
144 dimension, rocker
146 end, spring
148 surface, outer race plate
150 surface, outer race plate
152 edge, surface 148
154 edge, surface 150
156 inertia ring
158 fastener
160 gap
162 gap

The invention claimed is:
1. A one-way clutch, comprising:
an outer race including:
a first outer race plate defining a first rocker pocket, the first outer race plate including: a first annular planar surface facing in a first axial direction parallel to an axis of rotation of the one-way clutch, and a first pocket surface off-set from the first annular planar surface, wherein the first pocket surface defines the first rocker pocket in a second axial direction, opposite the first axial direction; and,
a second outer race plate:
non-rotatably connected to the first outer race plate; and,
defining a second rocker pocket;
an inner race axially disposed between the first outer race plate and the second outer race plate; and,
a rocker assembly including:
a rocker arranged to contact the inner race and including:
a first portion disposed in the first rocker pocket; and
a second portion disposed in the second rocker pocket;
a spring guide retained by the first outer race plate and the second outer race plate; and, a spring:
  engaged with the spring guide; and,
  in contact with the rocker.

2. The one-way clutch of claim 1, wherein:
the first portion of the rocker has a first maximum dimension in an axial direction parallel to an axis of rotation of the one-way clutch;
the second portion of the rocker has a second maximum dimension in the axial direction; and,
the first maximum dimension is equal to the second maximum dimension.

3. The one-way clutch of claim 1, wherein:
the first portion of the rocker has a first maximum dimension in an axial direction parallel to an axis of rotation of the one-way clutch;
the second portion of the rocker has a second maximum dimension in the axial direction; and,
  the first maximum dimension is smaller than and at least one quarter of the second maximum dimension; or,
  the first maximum dimension is smaller than and at least one third of the second maximum dimension; or,
  the second maximum dimension is smaller than and at least one quarter of the first maximum dimension; or,
  the second maximum dimension is smaller than and at least one third of the first maximum dimension.

4. The one-way clutch of claim 1, wherein:
the first outer race plate includes a first pocket wall connecting the first annular planar surface and the first pocket surface; and,
the first pocket wall defines the first rocker pocket in a radially outer direction orthogonal to the axis of rotation.

5. The one-way clutch of claim 1, wherein:
the second outer race plate includes:
  a second annular planar surface facing in the second axial direction; and,
  a second pocket surface off-set from the second annular planar surface; and,
the second pocket surface defines the second rocker pocket in the first axial direction.

6. The one-way clutch of claim 5, wherein:
the second outer race plate includes a second pocket wall connecting the second annular planar surface and the second pocket surface; and,
the second pocket wall defines the second rocker pocket in a radially outer direction orthogonal to the axis of rotation.

7. The one-way clutch of claim 1, wherein:
the spring guide includes a spring arm; and,
the spring is wrapped around the spring arm.

8. The one-way clutch of claim 1, wherein the spring guide includes:
a first portion disposed in the first rocker pocket; and,
a second portion disposed in the second rocker pocket.

9. The one-way clutch of claim 1, wherein the spring includes:
a first portion disposed in the first rocker pocket; and,
a second portion disposed in the second rocker pocket.

10. The one-way clutch of claim 1, wherein:
in a locked mode of the one-way clutch, the rocker is in contact with the inner race to block rotation of the outer race, with respect to the inner race, in a first circumferential direction around an axis of rotation of the one-way clutch;
in a free-wheel mode of the one-way clutch, the outer race is rotatable, with respect to the inner race in a second circumferential direction, opposite the first circumferential direction; and,
the rocker is pivotable to switch the one-way clutch between the locked mode and the free-wheel mode.

11. A one-way clutch, comprising:
an outer race including:
  a first outer race plate including:
    a first annular planar surface facing in a first axial direction parallel to an axis of rotation of the one-way clutch; and,
    a first pocket wall off-set, in a second axial direction opposite the first axial direction, from the first planar annular surface, and defining a first rocker pocket in the second axial direction; and,
  a second outer race plate including:
    a second annular planar surface facing in the second axial direction; and,
    a second pocket wall off-set, in the first axial direction, from the second planar annular surface, and defining a second rocker pocket in the first axial direction;
an inner race axially disposed between the first outer race plate and the second outer race plate; and,
a rocker assembly including:
  a rocker including:
    a first portion disposed in the first rocker pocket; and
    a second portion disposed in the second rocker pocket;
  a spring guide:
    retained by the first outer race plate and the second outer race plate;
    and, including a spring arm; and,
  a spring:
    retained by the first outer race plate and the second outer race plate;
    wrapped around the spring arm; and,
    in contact with the rocker.

12. The one-way clutch of claim 11, wherein the spring guide includes:
a first portion disposed in the first rocker pocket; and,
a second portion disposed in the second rocker pocket.

13. The one-way clutch of claim 11, wherein the spring includes:
a first portion disposed in the first rocker pocket; and,
a second portion disposed in the second rocker pocket.

14. The one-way clutch of claim 11, wherein:
the first pocket wall defines a rocker chamber in the second axial direction;
the second pocket wall defines the rocker chamber in the first axial direction; and,
an entirety of the spring guide is located in the rocker chamber.

15. The one-way clutch of claim 11, wherein the first outer race plate includes a third pocket wall:
connecting the first annular planar surface and the first pocket wall; and,
defining the first rocker pocket in a circumferential direction around the axis of rotation.

16. The one-way clutch of claim 11, wherein the second outer race plate includes a third pocket wall:
connecting the second annular planar surface and the second pocket wall; and,
defining the second rocker pocket in a circumferential direction around the axis of rotation.

17. The one-way clutch of claim 11, wherein:
the first portion of the rocker has a first extent in the second axial direction;
the second portion of the rocker has a second extent in the first axial direction; and,
the first extent is at least one third of the second extent.

18. A one-way clutch, comprising:
an outer race including:
- a first outer race plate including:
  - a first annular planar surface facing in a first axial direction parallel to an axis of rotation of the one-way clutch; and,
  - a first pocket wall off-set, in a second axial direction opposite the first axial direction, from the first planar annular surface, and defining a first rocker pocket in the second axial direction; and,
- a second outer race plate including:
  - a second annular planar surface facing in the second axial direction; and,
  - a second pocket wall off-set, in the first axial direction, from the second planar annular surface, and defining a second rocker pocket in the first axial direction;

an inner race axially disposed between the first outer race plate and the second outer race plate; and,
a rocker assembly including:
- a rocker including:
  - a first portion disposed in the first rocker pocket; and,
  - a second portion disposed in the second rocker pocket;
- a spring guide including:
  - a spring arm;
  - a first portion disposed in the first rocker pocket; and,
  - a second portion disposed in the second rocker pocket; and,
- a spring wrapped around the spring arm, in contact with the rocker, and including:
  - a first portion disposed in the first rocker pocket; and,
  - a second portion disposed in the second rocker pocket.

19. The one-way clutch of claim 18, wherein:
the first portion of the rocker has a first extent in the second axial direction;
the second portion of the rocker has a second extent in the first axial direction; and,
the first extent is at least one third of the second extent.

\* \* \* \* \*